F. Q. DUTTON.
MIXER.
APPLICATION FILED MAR. 7, 1912.
1,054,833.
Patented Mar. 4, 1913.
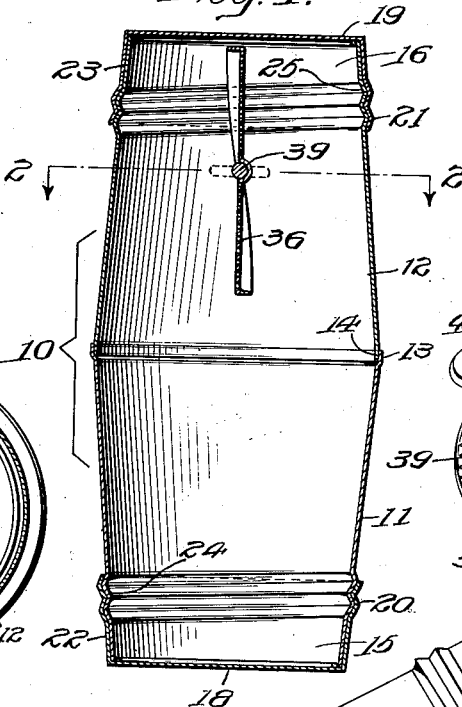
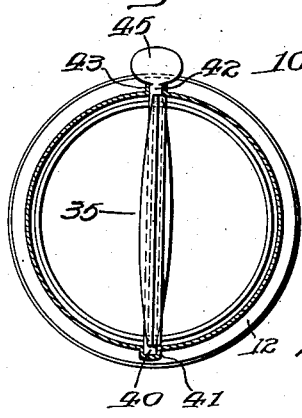
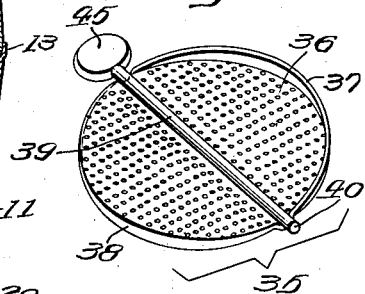
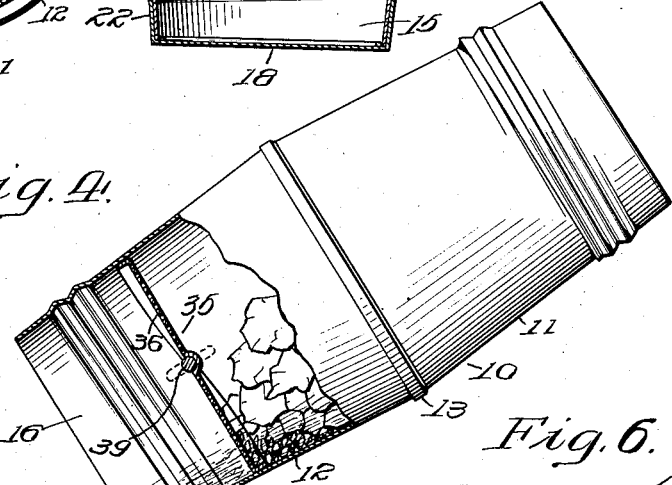
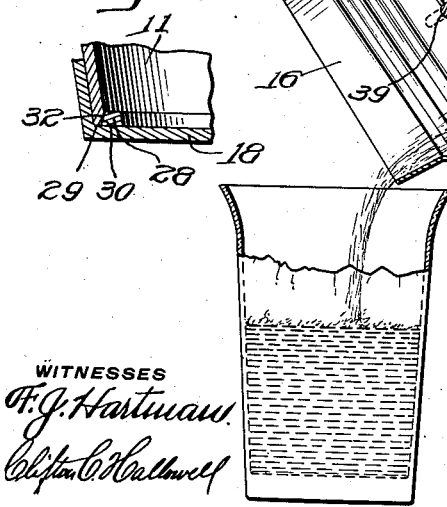
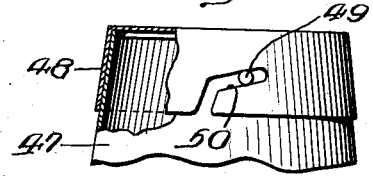
INVENTOR
Frank Q. Dutton.
WITNESSES
BY
ATTORNEY

UNITED STATES PATENT OFFICE.

FRANK Q. DUTTON, OF PHILADELPHIA, PENNSYLVANIA, ASSIGNOR OF ONE-THIRD TO EMANUEL G. KOLB, OF PHILADELPHIA, PENNSYLVANIA.

MIXER.

1,054,833.

Specification of Letters Patent. Patented Mar. 4, 1913.

Application filed March 7, 1912. Serial No. 682,247.

*To all whom it may concern:*

Be it known that I, FRANK Q. DUTTON, a citizen of the United States, and a resident of the city of Philadelphia, county of Philadelphia, and State of Pennsylvania, have invented certain new and useful Improvements in Mixers, of which the following is a specification, reference being had to the accompanying drawings.

This invention particularly relates to mixing devices which are actuated by shaking, and is especially directed to vessels for mixing fancy drinks.

The principal objects of this invention are, to provide a mixing vessel that may be conveniently manipulated by one hand of the operator; to provide a mixing vessel that may be readily cleansed; and to provide a mixing vessel with means arranged to retain any solid or coagulated particles therein, when pouring the contents therefrom.

Other objects of this invention are, to provide a mixing vessel with readily removable and adjustable end closures forming seals for said vessel; and to provide said vessel with a movable strainer having means to prevent its accidental displacement when in operative position.

A further object of this invention is, to provide a double frusto-conical mixing vessel having walls converging toward its opposite ends from a central region of maximum diameter, whereby its efficiency as a mixer is greatly enhanced.

This invention also comprehends all of the various novel features of construction and arrangement hereinafter more definitely specified.

In the accompanying drawings, Figure 1 is a central longitudinal sectional view of the preferred form of this invention, showing a mixer having a strainer in its inoperative position; Fig. 2 is a plan sectional view of said mixer taken on the line 2—2 in Fig. 1, showing the strainer in elevation for convenience of illustration; Fig. 3 is a perspective view of the strainer *per se;* Fig. 4 is a side elevational view, showing the mixer in position to be discharged, and a drinking glass receiving the contents, portions of said glass and vessel being broken away and shown in section for convenience of illustration; Fig. 5 is a fragmentary sectional view, showing the sealed joint between the body of the mixing vessel and its closure; and Fig. 6 is a fragmentary sectional elevation, showing an alternative means of attaching the closures to the body of the mixing vessel.

In said figures, the frusto-conical hollow body 10 of the mixing vessel is preferably composed of separately formed frusto-conical shells 11 and 12, having their larger peripheral edges 13 and 14 overlapped and permanently secured together by any convenient means, preferably by solder. The vessel body 10 thus formed is provided with openings 15 and 16 at its respectively opposite ends, which are provided with detachable closures 18 and 19, which are respectively provided with screw threads 20 and 21 conveniently rolled in their flaring walls 22 and 23, near their peripheral edges, and arranged to engage the screw threads 24 and 25 in the shells 11 and 12 adjacent to said openings 15 and 16. The closures are each provided with an annular ridge 28 coöperative with their respective walls 22 and 23 to form a groove 29 in the angle of the closure, for the reception of the edge of the vessel body, and as best shown in Fig. 5, said ridge provides a beveled surface 30 arranged to coöperate with the beveled surface 32 at the edges of the respective shells 11 and 12, whereby an absolutely fluid-tight joint is effected when the threads 20 and 21 of the respective closures are engaged with the threads 24 and 25 of the vessel body, and said threads may be so arranged that a partial rotation of the closures 18 and 19 will effect such coöperation of the closures with the ends of the vessel body as to effect the absolutely fluid-tight joint desired.

In order to retain the solid or coagulated particles within the mixing vessel when pouring the fluid therefrom, the mixing vessel is provided with a strainer 35, comprising the foraminous diaphragm 36 having oppositely disposed lips 37 and 38. Said strainer is provided with the rock-shaft 39 forming at one end a trunnion 40 for engagement in the socket bearing 41 in the wall of the vessel body 10, and a trunnion 42 mounted in the bearing sleeve 43 disposed in diametrically opposite relation to the socket bearing 41 in said vessel body. Said rock-shaft 39 is extended through the bearing 43 and is provided with a thumb-piece 45 for conveniently rotating the strainer within the mixing vessel. As best shown in Fig. 4, the lips 37 and 38 are arranged to engage the walls of the vessel body 10 when in its operative position, and by such engagement said strainer is prevented from accidental rotation by the ice or other heavy solid particles contained in the vessel body behind said strainer 35, whereby when it is desired to pour the contents of the mixing vessel into a drinking glass, as shown in Fig. 4, any pressure brought to bear upon the strainer 35 in the act of pouring the contents from the mixer, will tend to tighten said strainer in its operative position.

In the form of this invention shown in Fig. 6, the vessel body 47 is provided with a closure 48, which is conveniently secured to the vessel body 47 by a bayonet catch, comprising the lug 49 and the bayonet slot 50.

It will be obvious that by providing a mixing vessel in the form of a double conical frustum, the material to be mixed is brought together at the restricted ends of the vessel, and is thereby more efficiently mixed than if the mixing vessel were formed cylindrical, and that by rigidly connecting the parts as herein contemplated, the operator is enabled to manipulate the mixer with one hand.

It is not desired to limit this invention to the precise details of construction and arrangement herein set forth, as various modifications may be made therein without departing from the essential features of the invention as defined in the appended claims.

Having thus described my invention, I claim:

1. A mixing vessel comprising a double frusto-conical hollow body having opposite open ends, and closures for said open ends detachably engaged with said body, and having means comprising a groove coöperative with the edge of said body to seal the joint between said body and closures.

2. A mixing vessel comprising a hollow body having open ends, and closures for said ends provided with a ridge, forming a channel to receive the edges of said body, and coöperating with said edge to seal the joint between said body and closures.

3. A mixing vessel comprising a hollow body having openings in its opposite ends, and closures detachably engaged with said body, each provided with a ridge having a beveled edge for coöperative engagement with the peripheral edges of said body.

4. A mixing vessel comprising a hollow body having opposite open ends provided with beveled edges, and closures for said open ends, each provided with a ridge having a beveled surface coöperative with the beveled edges of said body to seal the joint between said body and closure.

5. A mixing vessel comprising a hollow body having opposite open ends, and a rotatable strainer disposed local to one of said ends.

6. A mixing vessel comprising a hollow body having opposite open ends, and a rotatable strainer disposed local to one of said ends, and having means extending exterior to said body for rotating said strainer.

7. A mixing vessel comprising a hollow body, and a strainer mounted for rotation therein, and comprising a foraminous diaphragm having lips engageable with the walls of said body, to prevent accidental rotation when in operative position.

8. A mixing vessel comprising a hollow body, a strainer mounted to rotate in said body on an axis transverse to the axis of said body, and comprising a foraminous diaphragm having oppositely disposed lips arranged to engage the walls of said body, to prevent its accidental rotation when in operative position, and means to manipulate said strainer.

9. A mixing vessel comprising a hollow body having openings in its opposite ends, detachable closures for said openings, and a strainer disposed nearer to one end than the other, and comprising a foraminous diaphragm, and a rock-shaft for said diaphragm having a thumb-piece extending exterior to said body for its convenient manipulation.

10. A mixing vessel comprising a hollow body having opposite open ends, closures for the openings in said ends, detachably engaged with said body, and a strainer mounted to rotate adjacent to one of said openings on an axis transverse to the axis of said body, and comprising a foraminous diaphragm having lips extending in opposite directions with respect to said diaphragm from the diametrically opposite sides thereof, and a rock-shaft for said diaphragm having a thumb-piece projecting exterior to said body for the convenient rotation of said strainer.

11. A mixing vessel comprising a double frusto-conical hollow body having openings in its opposite ends, closures for said openings having means comprising a beveled ridge coöperative with the edge of said body to seal the joint between said closures and body, and a strainer disposed adjacent one of said openings, and mounted for rotation on an axis transverse to the axis of said hollow body, and comprising a foraminous diaphragm having oppositely disposed lips extending from its diametrically opposite edges, and a rock-shaft for said diaphragm having a thumb-piece extending exterior to said body for conveniently rotating said diaphragm within said body.

12. A mixing vessel comprising a hollow body having opposite open ends and provided with a bearing socket, a diametrically oppositely disposed bearing bushing, and a circular strainer mounted to rotate within said body and comprising a rock-shaft having trunnions mounted in said bearings.

13. A mixing vessel comprising a hollow body having opposite open ends, and a strainer disposed within said body.

14. A mixing vessel comprising a hollow body having opposite open ends, and a rotatable strainer inclosed within said body.

15. A mixing vessel comprising a hollow body portion, a removable end portion, a rotatable strainer distinct from said end portion, located within said body portion, and means for rotating said strainer from the exterior of said body portion.

In witness whereof, I have hereunto set my hand this 6th day of March, A. D., 1912.

FRANK Q. DUTTON.

Witnesses:
CLIFTON C. HALLOWELL,
ALEXANDER PARK.